United States Patent
Perla et al.

(10) Patent No.: US 11,186,500 B2
(45) Date of Patent: *Nov. 30, 2021

(54) CATIONIC STARCH-BASED ADDITIVES FOR REDUCTION OF FOULING IN WATER COOLERS IN SAGD PRODUCTION SYSTEMS

(71) Applicant: Baker Hughes, a GE company, LLC, Houston, TX (US)

(72) Inventors: Carla Perla, Houston, TX (US); Carlos Diaz, Houston, TX (US); Bruce Oyer Horne, II, Sugar Land, TX (US); Keith Osness, Sugar Land, TX (US); Larry Sartori, Calgary (CA); Victor Barbu, Calgary (CA); Tomasa Ledesma, Houston, TX (US); Leonardo Franca, Sugar Land, TX (US); Cole T. Jones, Wharton, TX (US); Christabel Tomla, Richmond, TX (US)

(73) Assignee: Baker Hughes Holdings LLC, Houston, TX (US)

( * ) Notice: Subject to any disclaimer, the term of this patent is extended or adjusted under 35 U.S.C. 154(b) by 13 days.

This patent is subject to a terminal disclaimer.

(21) Appl. No.: 16/623,592

(22) PCT Filed: Jul. 25, 2017

(86) PCT No.: PCT/US2017/043646
§ 371 (c)(1),
(2) Date: Dec. 17, 2019

(87) PCT Pub. No.: WO2019/022713
PCT Pub. Date: Jan. 31, 2019

(65) Prior Publication Data
US 2021/0139355 A1    May 13, 2021

(51) Int. Cl.
*C02F 1/68* (2006.01)
*C02F 103/02* (2006.01)

(52) U.S. Cl.
CPC .......... *C02F 1/68* (2013.01); *C02F 2103/023* (2013.01); *C02F 2303/20* (2013.01)

(58) Field of Classification Search
USPC ................... 210/749, 338; 252/175; 516/141
See application file for complete search history.

(56) References Cited

U.S. PATENT DOCUMENTS

| 4,088,600 | A |   | 5/1978 | Tutein et al. |
| 6,042,732 | A | * | 3/2000 | Jankowski ............ C02F 11/147 210/727 |

(Continued)

FOREIGN PATENT DOCUMENTS

WO    2016201061 A1    12/2016

*Primary Examiner* — Nina Bhat
(74) *Attorney, Agent, or Firm* — Mossman, Kumar & Tyler, P.C.

(57) ABSTRACT

Methods and additives for reducing fouling in water coolers in Steam Assisted Gravity Drainage systems (SAGD) are described in which an additive comprising a cationic starch, either alone or in combination with a water clarifier compound, is introduced into a SAGD system, wherein a lower amount of the additive is used to achieve the same or better results in reducing fouling in the water coolers as compared to an otherwise identical method absent the additive.

19 Claims, 1 Drawing Sheet

(56) References Cited

U.S. PATENT DOCUMENTS

| | | | | |
|---|---|---|---|---|
| 6,217,778 B1* | 4/2001 | Shing | ............ | C02F 1/5245 |
| | | | | 210/708 |
| 9,758,395 B2* | 9/2017 | Sikes | ............ | C08G 69/10 |
| 2004/0007500 A1* | 1/2004 | Kresnyak | ............ | C10G 33/00 |
| | | | | 208/187 |
| 2004/0026657 A1* | 2/2004 | Souter | ............ | C02F 1/5236 |
| | | | | 252/181 |
| 2007/0051513 A1 | 3/2007 | Heins | | |
| 2009/0127205 A1* | 5/2009 | Sikes | ............ | C10G 1/047 |
| | | | | 210/725 |
| 2010/0193444 A1 | 8/2010 | Boodoo | | |
| 2011/0000854 A1* | 1/2011 | Nichols | ............ | B01J 20/26 |
| | | | | 210/666 |
| 2011/0147306 A1 | 6/2011 | Polizzotti et al. | | |
| 2014/0224733 A1 | 8/2014 | Osness et al. | | |
| 2016/0032197 A1 | 2/2016 | Weisner et al. | | |
| 2016/0326443 A1* | 11/2016 | Young | ............ | C10G 33/04 |
| 2018/0327673 A1 | 11/2018 | Bennett et al. | | |

\* cited by examiner

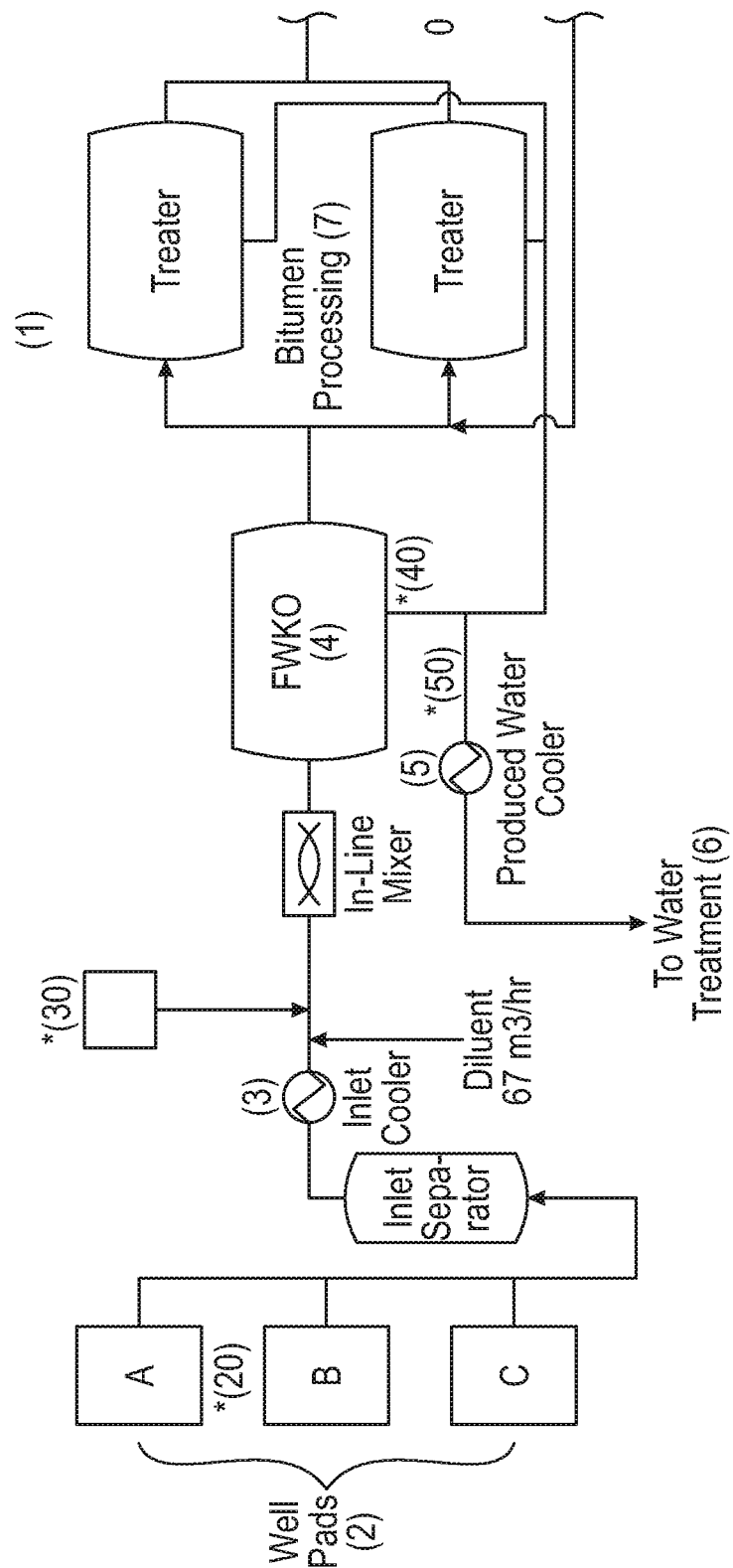

CATIONIC STARCH-BASED ADDITIVES FOR REDUCTION OF FOULING IN WATER COOLERS IN SAGD PRODUCTION SYSTEMS

TECHNICAL FIELD

The present invention relates to methods for reducing fouling in Steam Assisted Gravity Drainage ("SAGD") systems by the introduction of cationic starch-based additives, and more particularly using these additives to reduce fouling in water coolers utilized in SAGD systems.

BACKGROUND

In a standard SAGD system (1), which is shown in FIG. 1, steam is injected below ground in oil sands deposits and bitumen (i.e. "oil") is recovered through a pair of horizontal wells located in individual well pads (2) by heating the bitumen above its pour point. The temperature of the recovered bitumen and produced water is upwards of 200° C. and the result is a stable complex emulsion. The recovered production fluid is then cooled in one or more inlet production coolers (3) and sent to a first phase separation vessel (a two- or three-phase separation vessel depending on the facility) (4) to separate the bitumen from the produced water and gas or the liquid from gas. Once separated, the bitumen is sent for further processing (7). From the separation vessel (4), the produced water is sent through one or more produced water coolers (5), which are usually shell and tube heat exchangers or spiral heat exchangers, to cool the water. The produced water, after being cooled in the water cooler(s) (5), is then sent to further water treatment (6) to remove any oil remaining in the produced water, after which the water is converted to steam for reuse.

To help resolve the complex emulsion, fluid separation chemicals are injected at various locations upstream of the separation vessel (4). These commonly used chemistries in SAGD systems can cause fouling issues in the produced water coolers. The makeup of the foulants includes oil-soluble and water-soluble organic and inorganic material.

Coagulants (invert emulsion polymers) are often injected in the front end of SAGD systems as they have dehydration and anti-foulant properties. Because of the high molecular weight of these types of chemistries, they require a make-down skid on site to dilute fresh product for application, which is not feasible in some facilities. Another hindrance of coagulants is they sometimes create a large interfacial pad of emulsion that has to be suctioned off, and is reintroduced into the front end of the system as slop oil. This can cause compounding issues over time if the interfacial pad accumulates and the inlet chemistries are unable to resolve the emulsion.

Thus, it would be desirable to develop better water clarifiers and other additives for more effective reduction of fouling in SAGD systems.

SUMMARY

There is provided, in one non-limiting embodiment, a method for reducing fouling in water coolers in a SAGD system in which an additive comprising a cationic starch and a water clarifier compound(s) is introduced into a SAGD system, wherein a lower amount of the additive is used to achieve the same or better results in reducing fouling in the water coolers as compared to an otherwise identical method absent the additive.

There is additionally provided, in another non-restrictive version, a method for reducing fouling in water coolers in SAGD systems employing an additive consisting of a cationic starch, wherein a lower amount of the additive is used to achieve the same or better results in reducing fouling in water coolers as compared to an otherwise identical method absent the cationic starch.

Alternatively, there is provided, a method for reducing fouling in a SAGD system by introducing an additive comprising a quaternary ammonium cationic starch, wherein a lower amount of the additive is used to achieve the same or better results in reducing fouling in water coolers in the SAGD system as compared to an otherwise identical method absent the quaternary ammonium cationic starch.

BRIEF DESCRIPTION OF THE DRAWINGS

FIG. 1 is a schematic representation of a portion of a standard Steam Assisted Gravity Drainage ("SAGD") production system.

DETAILED DESCRIPTION

The present invention relates to the use of cationic starches, either alone or in combination with water clarifier compounds, as anti-foulants for water coolers in Steam Assisted Gravity Drainage ("SAGD") systems. It has been found that the cationic starches, either alone or blended with a water clarifier compound, are effective for reducing fouling in produced water coolers used in SAGD systems. The water-wetting properties of these cationic starch-based additives result in reduced oil coated solids thus increasing heat exchanger (i.e. water cooler) run times in high solid-load environments.

In a non-limiting example, a cationic starch-based additive may be introduced into the SAGD system by injecting the additive into the production fluid flowing through the SAGD system at one or more points or locations along the flow path in the SAGD system.

Referring to FIG. 1, the injection points for the additive may include, but are not limited to well pad (20), upstream of a separation vessel (30), at an outlet of the separation vessel (40), upstream of one or more production coolers located downstream of the separation vessel (50), and combinations thereof. In FIG. 1, these injection points are further indicated with an asterisk (*).

The production fluid may be a hybrid fluid containing both a hydrocarbon fluid and an aqueous fluid, such as the stable complex emulsion fluid that is recovered through the well pads in a SAGD system or any other oil-in-water emulsion, or an oil-in-brine emulsion, and combinations thereof. As the fluid flows through various stages and segments of the SAGD system, the production fluid may either be a hydrocarbon fluid, an aqueous fluid, or water, or combinations of these. An aqueous fluid may also be fluids having an aqueous continuous phase where the aqueous continuous phase can be all water, brine, seawater, or an injection fluid that comprises recycled production water that is injected back into a subterranean formation, and combinations thereof. Hydrocarbon fluids may also be oil-based fluids, which are fluids having a non-aqueous continuous phase where the non-aqueous continuous phase is all oil, a non-aqueous fluid, a water-in-oil emulsion, a water-in-non-aqueous emulsion, a brine-in-oil emulsion, a brine-in-non-aqueous emulsion, a seawater-in-non-aqueous emulsion. Also in oil-based fluids, solid particles are suspended in a continuous phase consisting of oil or another non-aqueous fluid. Water or brine can be emulsified in the oil; therefore, the oil is the continuous phase. In oil-based fluids, the oil may consist of any oil or water-immiscible fluid that may include, but is not limited to, diesel, mineral oil, esters, refinery cuts and blends, or alpha-olefins.

"System" is broadly defined herein to be an oilfield, subterranean, or treatment facility or operation that includes a fluid and any components therein (e.g. pipes or conduits where the fluid may flow through or alongside).

Suitable cationic starches for reducing fouling in SAGD systems include, but are not limited to, corn starches, potato starches, tapioca starches, sago starches, rice starches, wheat starches, waxy maize starches, grain sorghum starches, grain starches, plant starches, biopolymers, and combinations thereof.

The cationic starches useful for reducing fouling may also include quaternary ammonium cationic starches.

In exemplary embodiments, one or more of the aforementioned cationic starches may be used alone or in combination with or blended with water clarifier compounds. Examples of useful water clarifier compounds include, but are not limited to, quaternary ammonium compounds, dithiocarbamates, polycondensates based on N,N'-bis[3-(dimethylamino)propyl]urea, polyacrylate copolymers, polyacrylamide copolymers, poly(acrylate/acrylamide) copolymers, polycondensate alkanolamines, such as polycondensates based on triethanolamines, quaternized condensed alkanolamines, and combinations thereof.

In a non-restrictive embodiment, the additive is a blend or combination comprising from about 36 weight % to about 95 weight % cationic starch and from about 3 weight % to about 50 weight % water clarifier compound.

The cationic starch-based additives described herein are capable of reducing fouling under the temperature and pressure conditions typical of those of existing throughout SAGD systems. In a non-restrictive embodiment, the temperature of the production fluid into which the cationic starch-based additives may be introduced may range from about 119° C. to about 200° C.

The amount of cationic starch-based additive introduced to the SAGD system may be from about 3 ppm independently to about 150 ppm or from about 50 ppm independently to about 200 ppm based on the total amount of water in the production fluid. It will be appreciated that this range of amounts may represent additive amounts that are lower than the amounts of conventional or traditional water clarifier chemistries typically applied to achieve reduced fouling in water coolers in SAGD systems. Success is obtained if less fouling occurs in the presence of the additives described herein than in the absence of the additive.

The additive may reduce, suppress, inhibit, or decrease the amount of and/or the rate of fouling within any part of the SAGD system. That is, it is not necessary for fouling to be entirely prevented for the methods and compositions discussed herein to be considered effective, although complete prevention is a desirable goal.

The invention will be further described with respect to the following Examples, which are not meant to limit the invention, but rather to further illustrate the various embodiments.

EXAMPLES

Cationic starch-based additives of the type described herein were tested in standard SAGD systems to evaluate their performance.

Testing was conducted on sample production fluids injected with additives comprising both a cationic starch and a quaternary ammonium water clarifier product of the kind described herein. The first additive evaluated contained 85% cationic starch and 11.25% quaternary ammonium compound water clarifier. The second additive evaluated contained 60% cationic starch, 30% cationic starch, and 4.5% quaternary ammonium compound water clarifier.

These additives were introduced to the SAGD system at dosage amounts and injection rates that were lower than those of the conventional chemistries used in SAGD systems. Samples of production fluids containing these additives after they were injected into the system were then bottle tested. When bottle tested in the lab, the samples containing these two additives demonstrated better water-wetting/water-wettability than incumbent chemistries. Similar additives were used in an ongoing field trial at a facility that has not required exchanger cleanouts for ten months, while the previous clean-out rate was 8 days with traditional SAGD water clarifier chemistries. Additional trials of cationic starch and water clarifier compound blends showed a significant reduction of heat exchanger fouling, virtual elimination of slop oil generation (resulting from poor conversion of SAGD reverse emulsion), maintenance of water quality in the range from about 5 ppm to about 150 ppm oil in water, and maintenance of diluted bitumen dehydration to concentrations below 0.5% BS&W. These results were achieved at a dosage that was approximately 15% of the chemistry previously used (e.g. 8-12 ppm starch-based chemistry vs. 70-75 ppm non-starch based chemistry).

Evaluations were also conducted on anti-foulant additives made up of 100% cationic starch.

Samples of production fluids containing additives made up exclusively of a cationic starch were bottle tested at dosage amounts ranging from 100 ppm to 165 ppm. When bottle tested in the lab, the samples containing the cationic starch alone as the additive demonstrated better water-wetting/water-wettability than incumbent chemistries.

In the foregoing specification, the invention has been described with reference to specific embodiments thereof, and has been described as effective methods and additives for reducing fouling in SAGD systems. However, it will be evident that various modifications and changes can be made thereto without departing from the broader scope of the invention as set forth in the appended claims. Accordingly, the specification is to be regarded in an illustrative rather than a restrictive sense. For example, specific cationic starches, water clarifier compounds, fluids, process or system conditions, and system equipment, and the like falling within the claimed parameters, but not specifically identified or tried, are expected to be within the scope of this invention.

The present invention may suitably comprise, consist of or consist essentially of the elements disclosed and may be practiced in the absence of an element not disclosed. For instance, the additive for reducing fouling in water coolers in steam assisted gravity drainage system may (1) comprise, consist essentially of, or consist of a cationic starch, (2) may comprise, consistent essentially of, consist of a cationic starch and a water clarifier product or (3) may comprise, consist essentially of, or consist of a quaternary ammonium cationic starch. Further, there may be provided a method for reducing fouling in water coolers in a steam assisted gravity drainage system, where the method consists essentially of or consists of introducing into the steam assisted gravity drainage system an additive for reducing fouling in water coolers in the steam assisted gravity drainage system, where the additive consists essentially of or consists of a cationic starch and optionally a water clarifier compound, wherein a lower amount of the additive is used to achieve the same or better results in reducing fouling in water coolers in the steam assisted gravity drainage system as compared to an otherwise identical method absent the additive.

As used herein, the terms "comprising," "including," "containing," "characterized by," and grammatical equivalents thereof are inclusive or open-ended terms that do not exclude additional, unrecited elements or method acts, but also include the more restrictive terms "consisting of" and "consisting essentially of" and grammatical equivalents thereof. As used herein, the term "may" with respect to a material, structure, feature or method act indicates that such is contemplated for use in implementation of an embodiment of the disclosure and such term is used in preference to the more restrictive term "is" so as to avoid any implication that other, compatible materials, structures, features and methods usable in combination therewith should or must be, excluded.

As used herein, the singular forms "a," "an," and "the" are intended to include the plural forms as well, unless the context clearly indicates otherwise.

As used herein, the term "and/or" includes any and all combinations of one or more of the associated listed items.

As used herein, relational terms, such as "first," "second," "top," "bottom," "upper," "lower," "over," "under," etc., are used for clarity and convenience in understanding the disclosure and do not connote or depend on any specific preference, orientation, or order, except where the context clearly indicates otherwise.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" in reference to a given parameter is inclusive of the stated value and has the meaning dictated by the context (e.g., it includes the degree of error associated with measurement of the given parameter).

What is claimed is:

1. A method for reducing fouling in water coolers in a steam assisted gravity drainage system, the method comprising: introducing into the steam assisted gravity drainage system an additive for reducing fouling in water coolers in the steam assisted gravity drainage system, the additive comprising a cationic starch and a water clarifier compound, wherein a lower amount of the additive is used to achieve the same or better results in reducing fouling in water coolers in the steam assisted gravity drainage system as compared to an otherwise identical method absent the additive.

2. The method of claim 1 wherein the additive is introduced into a production fluid flowing through the steam assisted gravity drainage system, the production fluid being selected from the group consisting of a hydrocarbon stream, an aqueous stream, and combinations thereof.

3. The method of claim 1 wherein the water clarifier compound is selected from the group consisting of quaternary ammonium compounds, dithiocarbamates, polycondensates based on N,N'-bis[3-(dimethylamino)propyl]urea, polyacrylate copolymers, polyacrylamide copolymers, poly (acrylate/acrylamide) copolymers, polycondensate alkanolamines, and combinations thereof.

4. The method of claim 1 wherein the cationic starch is selected from the group consisting of corn starches, potato starches, tapioca starches, sago starches, rice starches, wheat starches, waxy maize starches, grain sorghum starches, grain starches, plant starches, biopolymers, and combinations thereof.

5. The method of claim 1 wherein the additive comprises 36 weight % to about 95 weight % cationic starch.

6. The method of claim 1 where in the additive comprises 3 weight % to about 50 weight % water clarifier compound.

7. The method of claim 2 wherein the additive is introduced in an amount ranging from about 3 ppm to about 150 ppm based on the total amount of water in the production fluid.

8. The method of claim 2 wherein the temperature of the production fluid ranges from about 119° C. to about 200° C.

9. The method of claim 1 wherein the additive is introduced at a location in the steam assisted gravity drainage system selected from the group consisting of at a well pad, inlet of a separation vessel, at an outlet of the separation vessel, upstream of one or more production coolers located downstream of the separation vessel, and combinations thereof.

10. A method for reducing fouling in water coolers in a steam assisted gravity drainage system, the method comprising: introducing into the steam assisted gravity drainage system an additive for reducing fouling in water coolers in the steam assisted gravity drainage system, the additive consisting of a cationic starch, wherein a lower amount of the additive is used to achieve the same or better results in reducing fouling in water coolers in the steam assisted gravity drainage system as compared to an otherwise identical method absent the additive.

11. The method of claim 10 wherein the additive is introduced into a production fluid flowing through the steam assisted gravity drainage system, the production fluid being selected from the group consisting of a hydrocarbon stream, an aqueous stream, and combinations thereof.

12. The method of claim 10 wherein the cationic starch is selected from the group consisting of corn starches, potato starches, tapioca starches, sago starches, rice starches, wheat starches, waxy maize starches, grain sorghum starches, grain starches, plant starches, biopolymers, and combinations thereof.

13. The method of claim 11 wherein the additive is introduced to the production fluid in an amount ranging from about 3 ppm to about 150 ppm based on the total amount of water in the production fluid.

14. The method of claim 10 wherein the additive is introduced at a location in the steam assisted gravity drainage system selected from the group consisting of at a well pad, inlet of a separation vessel, at an outlet of the separation vessel, upstream of one or more production coolers located downstream of the separation vessel, and combinations thereof.

15. A method for reducing fouling in water coolers in a steam assisted gravity drainage system, the method comprising: introducing into the steam assisted gravity drainage system an additive for reducing fouling in water coolers in the steam assisted gravity drainage system, the additive comprising a quaternary ammonium cationic starch, wherein a lower amount of the additive is used to achieve the same or better results in reducing fouling in water coolers in the steam assisted gravity drainage system as compared to an otherwise identical method absent the additive.

16. The method of claim 15 wherein the additive is introduced into a production fluid flowing through the steam assisted gravity drainage system, the production fluid being selected from the group consisting of a hydrocarbon stream, an aqueous stream, and combinations thereof.

17. The method of claim 16 wherein the additive is introduced to the production fluid in an amount ranging from about 3 ppm to about 150 ppm based on the total amount of water in the production fluid.

18. The method of claim 16 wherein the temperature of the production fluid ranges from about 119° C. to about 200° C.

19. The method of claim 15 wherein the additive is introduced at a location in the steam assisted gravity drainage system selected from the group consisting of at a well pad, inlet of a separation vessel, at an outlet of the separation vessel, upstream of one or more production coolers located downstream of the separation vessel, and combinations thereof.

* * * * *